US009025643B2

(12) United States Patent
Mouri et al.

(10) Patent No.: US 9,025,643 B2
(45) Date of Patent: May 5, 2015

(54) COMMUNICATION APPARATUS, COMMUNICATION METHOD AND INTEGRATED CIRCUIT

(75) Inventors: Toshinari Mouri, Fukuoka (JP); Kensuke Yoshizawa, Fukuoka (JP); Yuko Inoue, Fukuoka (JP); Noriaki Maehara, Fukuoka (JP); Maiko Taruki, Fukuoka (JP); Shigekiyo Nosaka, Fukuoka (JP); Tsuyoshi Yamaguchi, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 276 days.

(21) Appl. No.: 13/638,868

(22) PCT Filed: Mar. 31, 2011

(86) PCT No.: PCT/JP2011/001956
§ 371 (c)(1),
(2), (4) Date: Oct. 1, 2012

(87) PCT Pub. No.: WO2011/125315
PCT Pub. Date: Oct. 13, 2011

(65) Prior Publication Data
US 2013/0022135 A1  Jan. 24, 2013

(30) Foreign Application Priority Data
Apr. 2, 2010  (JP) ................. 2010-086453

(51) Int. Cl.
*H04L 25/52* (2006.01)
*H04L 25/20* (2006.01)
(Continued)

(52) U.S. Cl.
CPC .......... *H04L 12/4625* (2013.01); *H04L 12/403* (2013.01); *H04B 3/54* (2013.01);
(Continued)

(58) Field of Classification Search
USPC .......................... 375/211, 219, 222
See application file for complete search history.

(56) References Cited

U.S. PATENT DOCUMENTS 6,351,830 B1   2/2002  Han
8,537,819 B2*  9/2013  Koga et al. .................... 370/390
(Continued)

FOREIGN PATENT DOCUMENTS

CN        1220423 A    6/1999
EP      1 426 240 A1    6/2004
(Continued)

OTHER PUBLICATIONS

International Search Report dated Jun. 28, 2011.
(Continued)

*Primary Examiner* — Ted Wang
(74) *Attorney, Agent, or Firm* — Seed IP Law Group PLLC

(57) ABSTRACT

A communication apparatus communicates with another communication apparatus. The communication apparatus includes a first communication unit configured to receive serial data from a first communication apparatus that is serially connected to the communication apparatus; a modulation unit configured to modulate the serial data received by the first communication unit into data other than the serial data to generate transmission data; and a second communication unit configured to perform first unicast transmission which involves transmitting the transmission data by designating a second communication apparatus as a transmission destination and second unicast transmission which involves transmitting the transmission data by designating a third communication apparatus as a transmission destination.

16 Claims, 13 Drawing Sheets

(51) Int. Cl.
*H04B 17/02* (2006.01)
*H04L 12/46* (2006.01)
*H04L 12/403* (2006.01)
*H04B 3/54* (2006.01)
*H04B 7/17* (2006.01)

(52) U.S. Cl.
CPC . *H04B2203/5408* (2013.01); *H04B 2203/5433* (2013.01); *H04B 2203/5437* (2013.01); *H04B 2203/5445* (2013.01)

(56) References Cited

U.S. PATENT DOCUMENTS

2007/0115973 A1* 5/2007 Koga et al. .................... 370/389

2010/0232333 A1* 9/2010 Higuchi et al. ............... 370/312

FOREIGN PATENT DOCUMENTS

| | | |
|---|---|---|
| JP | 64-077248 | 3/1989 |
| JP | 3-038949 | 4/1991 |
| JP | 6-204957 | 7/1994 |
| JP | 7-310924 | 11/1995 |
| JP | 2001-069128 | 3/2001 |
| JP | 2007-150513 | 6/2007 |
| JP | 2009-100413 | 5/2009 |

OTHER PUBLICATIONS

Chinese Office Action and Search Report dated Jul. 30, 2014, for corresponding CN Application No. 201180017555.1, 31 pages.

* cited by examiner

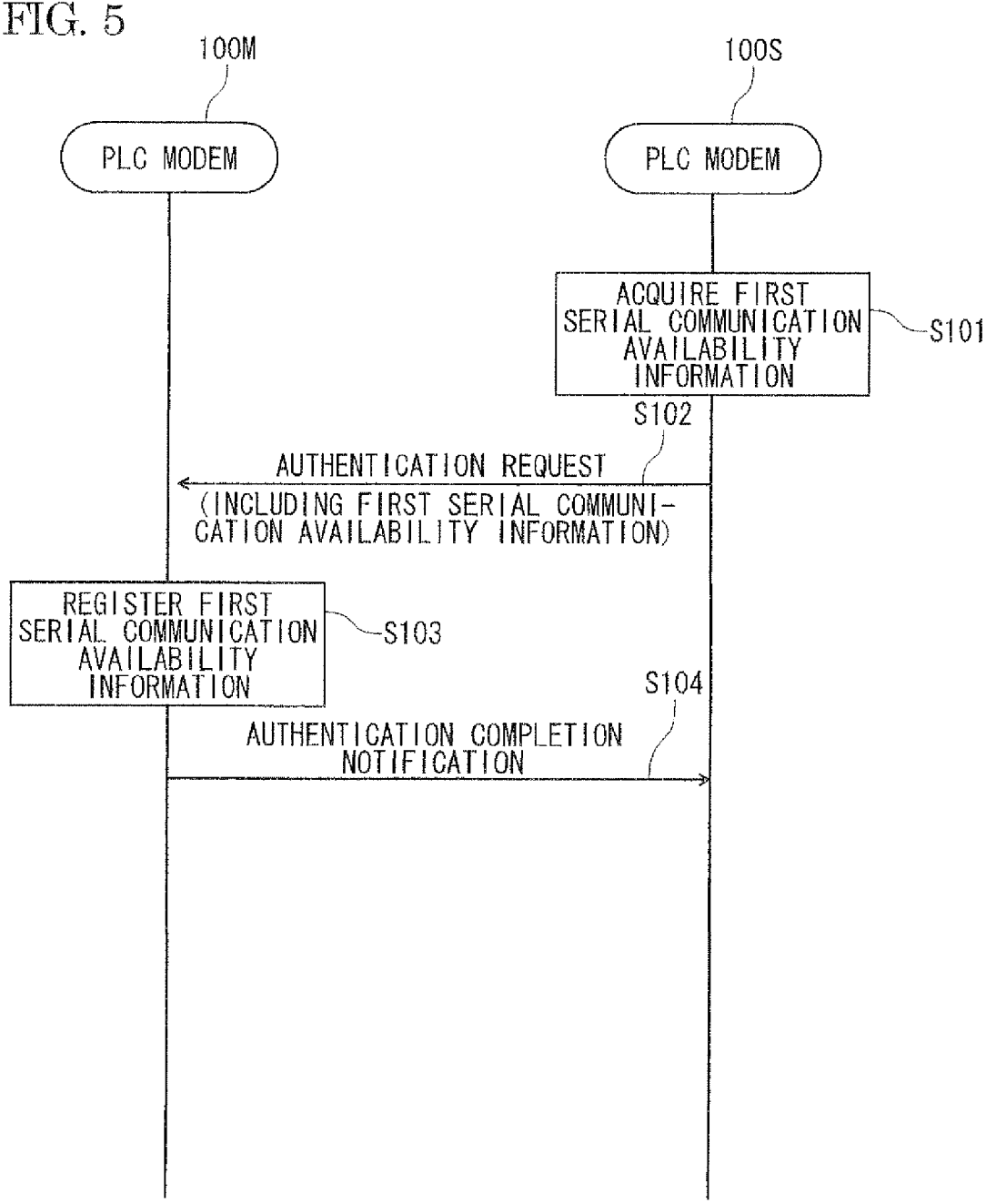

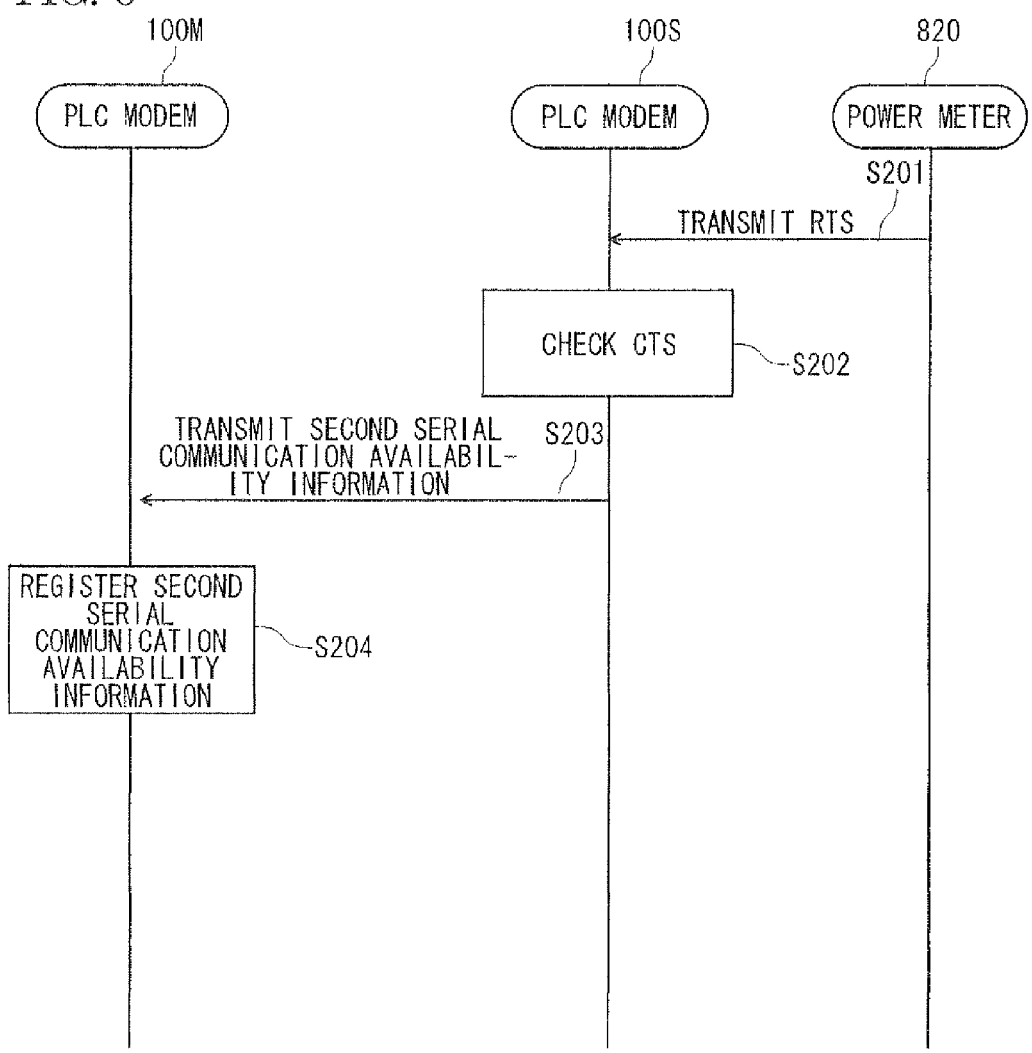

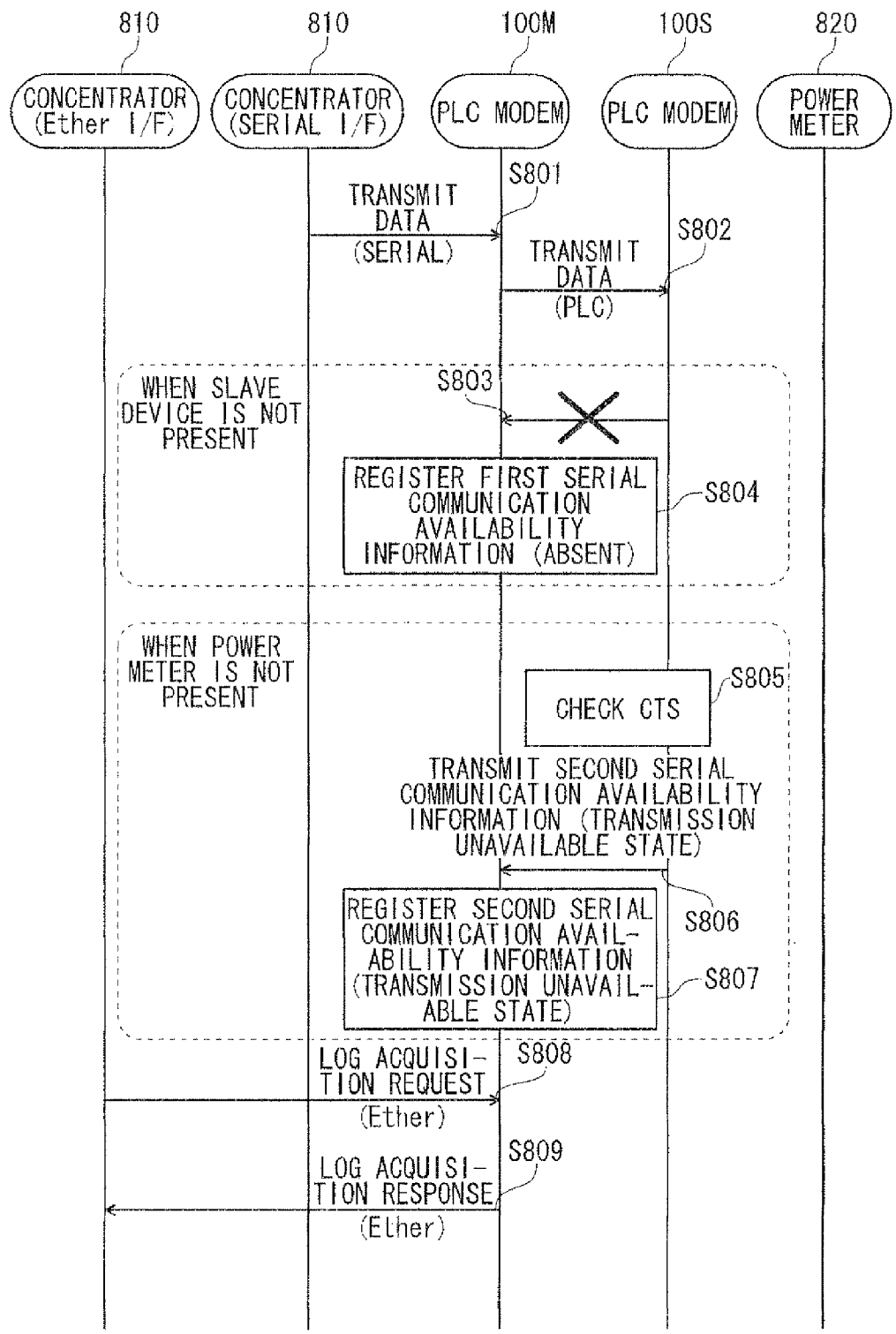

COMMUNICATION APPARATUS, COMMUNICATION METHOD AND INTEGRATED CIRCUIT

BACKGROUND

1. Technical Field

The present invention relates to a communication apparatus, a communication method and an integrated circuit.

2. Related Art

In the related art, serial communication is known as a communication method for performing communication between multiple communication apparatuses. In serial communication, data is sequentially transmitted and received on a transmission path by one bit at a time. Serial communication provides advantages such as no problem of a clock shift between transmission paths, the ease of noise countermeasures regardless of a location since a small number of cables are required, and no possibility of leakage of transmitted signals to other transmission paths.

As an example of a communication apparatus that performs such serial communication, there is a communication apparatus that includes a serial bus connector and allows a predetermined information processing apparatus connected to the serial bus connector to transmit data to another communication apparatus that is paired with the communication apparatus in advance via Bluetooth (registered trademark) wireless communication (for example, see JP-A-2009-100413).

SUMMARY

However, in the technique of JP-A-2009-100413, when information from an information processing apparatus serially connected to the communication apparatus is to be transmitted to a plurality of communication apparatuses, since it is not possible to specify a communication apparatus corresponding to a transmission destination from the obtained serial data, it is not possible to transmit the information to only a specific communication apparatus among the plurality of communication apparatuses.

Further, even when the serial data includes identification information of the transmission destination, since serial data has a plurality of data formats, analyzing the data requires a long period of time and the data analysis process is complicated.

In view of these problems, an object of the following embodiment is to provide a communication apparatus, a communication method and an integrated circuit capable of transmitting serial data transmitted from a serial communication device to a plurality of communication apparatuses.

A communication apparatus according to the following embodiment is a communication apparatus that communicates with another communication apparatus, including: a first communication unit configured to receive serial data from a first communication apparatus that is serially connected to the communication apparatus; a modulation unit configured to modulate the serial data received by the first communication unit into data other than the serial data to generate transmission data; and a second communication unit configured to perform first unicast transmission which involves transmitting the transmission data by designating a second communication apparatus as a transmission destination and second unicast transmission which involves transmitting the transmission data by designating a third communication apparatus as a transmission destination.

According to the communication apparatus, it is possible to transfer serial data transmitted from a serial communication device to a plurality of communication apparatuses.

BRIEF DESCRIPTION OF THE DRAWINGS

FIG. 5 is a diagram illustrating an example of a notification sequence of serial communication availability information when a slave device is to be registered in a master device according to the embodiment.

FIG. 6 is a diagram illustrating an example of a notification sequence of serial communication availability information using "RTS" and "CTS" according to the embodiment.

FIG. 13 is a sequence diagram illustrating a sixth communication example of the communication system according to the embodiment.

DETAILED DESCRIPTION

Hereinafter, a communication apparatus according to an embodiment will be described with reference to the drawings.

A communication apparatus according to the present embodiment is a communication apparatus that performs communication via a power line, for example. In this example, although a PLC modem is described as an example of the communication apparatus, other types of communication apparatuses may be used. For example, a communication apparatus that performs communication via wires such as a wired LAN and a coaxial cable and a communication apparatus that performs wireless communication such as a wireless LAN and Bluetooth (registered trademark) may be taken into consideration.

Figure 1:
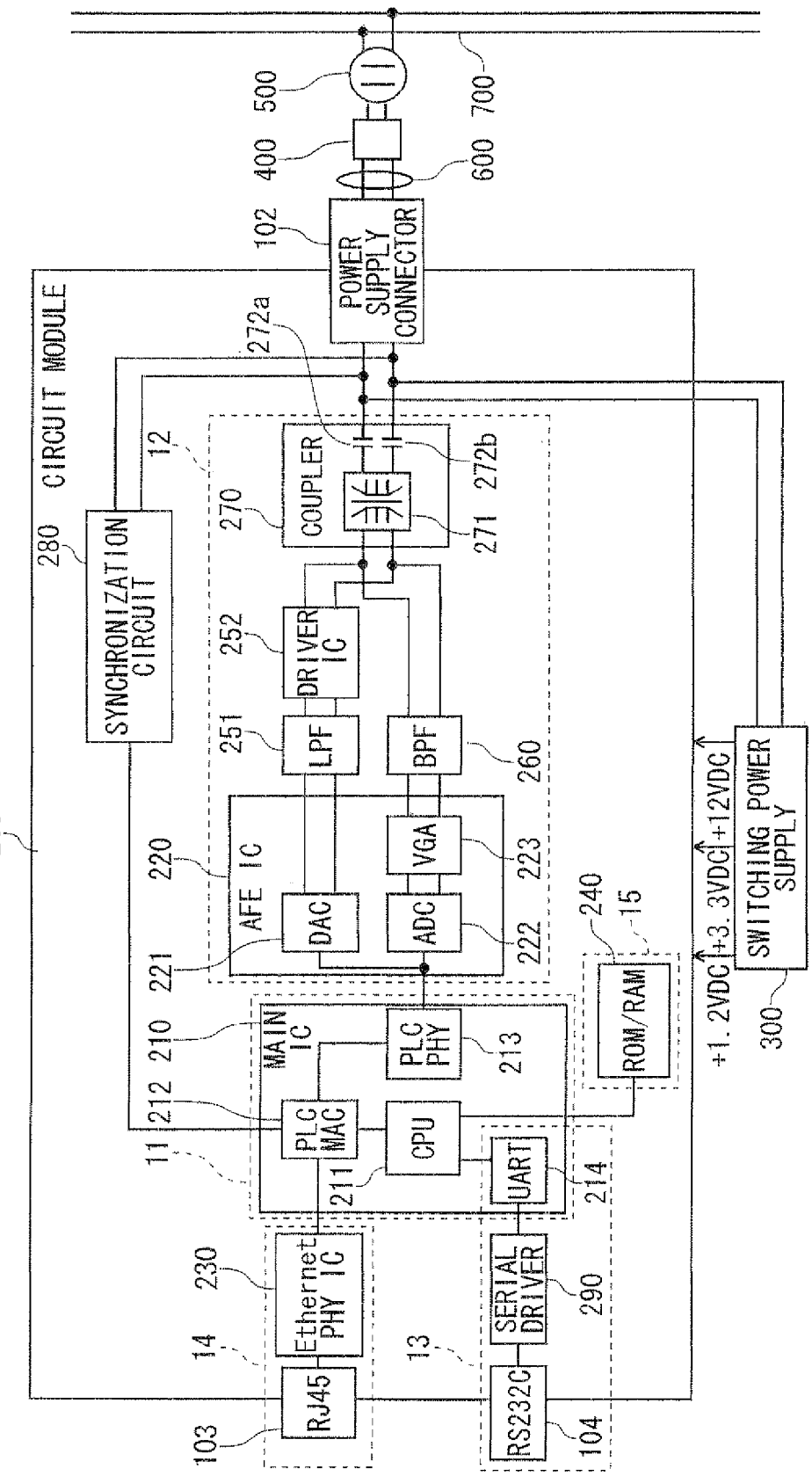
FIG. 1 is a diagram illustrating an example of hardware of a PLC modem according to an embodiment.

FIG. 1 illustrates an example of a hardware configuration of a PLC modem 100. The PLC modem 100 includes a circuit module 200 and a switching power supply 300. The switching power supply 300 supplies various voltages (for example, +1.2 V, +3.3 V, or +12 V) to the circuit module 200, and is configured to include a switching transformer and a DC-DC converter (neither of them is illustrated), for example.

A main IC (Integrated Circuit) 210, an AFE IC (Analog Front End Integrated. Circuit) 220, an Ethernet (registered trademark) PHY IC (PHYsical layer Integrated Circuit) 230, a ROM (Read Only Memory)/RAM (Random. Access Memory) 240, a Low-Pass Filter (LPF) 251, a driver IC 252, a Band-Pass Filter (BPF) 260, a coupler 270, a synchronization circuit 280, and a serial bus 290 are formed on the circuit module 200. The switching power supply 300 and the coupler 270 are connected to a power supply connector 102 and are further connected to a power line 700 via a power supply cable 600, a power plug 400, and a socket 500. The main IC 210 is an integrated circuit that functions as a control circuit that performs power line communication.

Moreover, a modular jack 103 for LAN (Local Area Network) such as an RJ45 and a serial interface (serial I/F) 104 such as an RS-232C are formed on the circuit module 200 as various interfaces. A LAN cable (not illustrated) is connected to the modular jack 103. Moreover, a serial cable (not illustrated) is connected to the serial interface 104.

The main IC 210 includes a CPU (Central Processing Unit) 211, a PLC MAC (Power. Line Communication Media Access Control layer) block 212, a PLC PITY (Power Line Communication PHYsical layer) block 213, and a UART (Universal Asynchronous Receiver Transmitter) 214.

The CPU 211 includes a 32-bit RISC (Reduced Instruction Set Computer) processor. The PLC MAC block 212 manages a MAC layer (Media Access Control layer) for transmission and reception signals, and the PLC PHY block 213 manages a PHY layer (Physical layer) for transmission and reception signals. The UART 214 performs conversion between parallel signals and serial signals and is used as an interface in combination with the serial driver 290. For example, the UART 214 converts a parallel signal from a bus that connects the CPU 211 or the like into a serial signal and performs the reverse conversion.

The AFE IC 220 is configured to include a DA converter (DAC: D/A converter) 221, an AD converter (ADC: A/D converter) 222, and a variable gain amplifier (VGA) 223. The coupler 270 is configured to include a coil transformer 271 and coupling capacitors 272a and 272b.

The CPU 211 controls the operation of the PLC MAC block 212 and the PLC PHY block 213 using the data stored in the ROM/RAM 240 and controls the operation of the entire PLC modem 100.

The synchronization circuit 280 generates a synchronization signal necessary for a plurality of PLC modems 100 communicating with each other to perform control at the same timings. For example, the synchronization circuit 280 detects a zero-crossing point of a commercial alternating power waveform AC (that is, an alternating waveform made up of a sinusoidal wave of 50 Hz or 60 Hz) supplied to the power line 700 and generates a synchronization signal based on this timing. As a specific example of the synchronization signal, a rectangular wave made up of a plurality of pulses synchronized to a zero-crossing point of an alternating power waveform is used.

The serial driver 290 performs adjustment or the like of a signal level so that communication can be possible via the serial interface 104.

Communication of the PLC modem 100 is generally performed as follows. Data input from the modular jack 103 is transmitted to the main IC 210 via the Ethernet (registered trademark) PHY IC 230. Alternatively, data input from the serial interface 104 is transmitted to the main IC 210 via the serial driver 290. Digital signal processing is performed on the data transmitted to the main IC 210, whereby a digital transmission signal is generated. The generated digital transmission signal is converted into an analog signal by the DA converter (DAC) 221 of the AYE IC 220 and output to the power line 700 via the low-pass filter 251, the driver IC 252, the coupler 270, the power supply connector 102, the power supply cable 600, the power plug 400, and the socket 500.

The signal received from the power line 700 is transmitted to the band-pass filter 260 via the coupler 270, the gain thereof is adjusted by the variable gain amplitude (VGA) 223 of the AFE IC 220, and then, the signal is converted into a digital signal by the AD converter (ADC) 222. Moreover, the converted digital signal is transmitted to the main IC 210 and subjected to digital signal processing, whereby the digital signal is converted into digital data. The converted digital data is output from the modular jack 103 via the Ethernet (registered trademark) PHY IC 230 or output from the serial interface 104 via the serial driver 290.

Next, an example of the digital signal processing realized by the main IC 210 will be described. The PLC modem 100 uses a multi-carrier signal such as an OFDM (Orthogonal Frequency Division Multiplexing) signal generated using a plurality of subcarriers as a transmission signal.

The PLC modem 100 converts transmission subject data into a multi-carrier transmission signal such as an OFDM signal, outputs the multi-carrier transmission signal, and processes a multi-carrier reception signal such as an OFDM signal to convert the multi-carrier received signal into received data. Digital signal processing for these conversion operations is performed mainly by the PLC PHY block 213.

The PLC modem 100 illustrated in FIG. 1 is connected to the power line 700 and constitutes a communication system together with other PLC modems 100.

Next, a communication system according to the present embodiment will be described.

In this example, although the communication system is assumed to be an AMR (Automatic Meter Reading) system that transmits power data from a power meter to a server of a power company via a power line, the communication system may be other types of communication systems.

Figure 2:
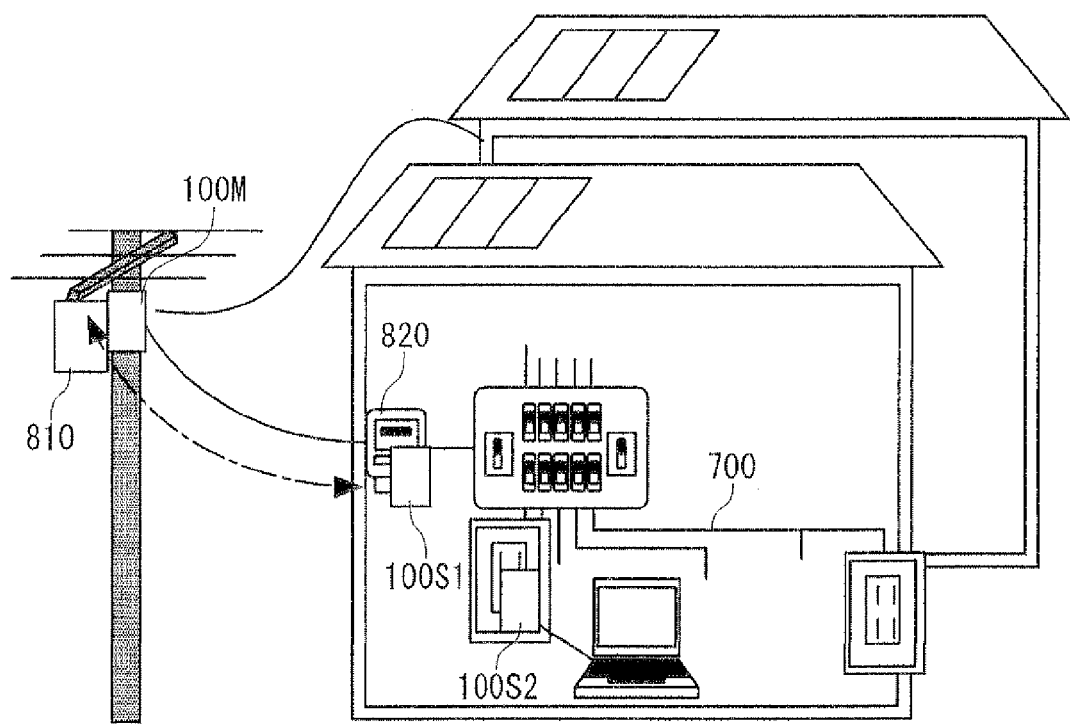
FIG. 2 is a conceptual diagram illustrating an example of a system configuration of a communication system according to the embodiment.

FIG. 2 is a conceptual diagram illustrating an example of a system configuration of the communication system according to the present embodiment.

The communication system illustrated in FIG. 2 is configured to include a concentrator 810, a PLC modem 100M that functions as master device, a PLC modem 100S (100S1, 100S2, and so on) that functions as slave device, a power meter 820, and a PC 830 as necessary.

The concentrator 810 is an example of a communication apparatus that performs communication using serial data, and is connected to each PLC modem 100M that is attached, for example, to an exterior power pole or the like and about one unit per one house is installed. Moreover, the concentrator 810 transmits various types of data to the PLC modem 100M in order to request the information about the power meter 820 and receives various types of data including the information about the power meter 820 from the PLC modem 100M. Moreover, the concentrator 810 transmits various types of data including the information about the power meter 820 to a server of a power company (not illustrated). The concentrator 810 can collect power data of fifteen houses, for example.

The PLC modem 100M that functions as master device is attached to an exterior power pole or the like, for example, and performs management of the PLC modem 100S that functions as slave device. Moreover, the PLC modem 100M transmits various types of data to the PLC modem 100S in order to request information about the power meter 820 and receives various types of data including the information about the power meter 820 from the PLC modem 100S. Further, the PLC modem 100M performs a process of registering the PLC modem 100S serving as a management subject. The registered information is stored in the ROM/RAM 240 of the PLC modem 100M.

The PLC modem 100S that functions as slave device is disposed at the interior, for example, and is managed by the PLC modem 100M that functions as master device. A plurality of PLC modems 100S (100S1, 100S2, and so on) can be connected to one PLC modem 100M. Moreover, the PLC modem 100S transmits various types of data to the power meter 820 in order to request information about the power meter 820 and receives various types of data including the information about the power meter 820 from the power meter 820.

The power meter 820 is an example of electrical device that performs serial data communication and is installed in a house or the like. Moreover, the power meter 820 is serially connected to one PLC modem 100S (in this example, the PLC modem 100S1) and performs one-to-one serial communication. The power meter 820 transmits various types of data including the information about the power meter 820 to the PLC modem 100S1 and receives various types of data for requesting the information about the power meter 820 from the PLC modem 100S1. The information about the power meter 820 includes power data or the like that indicates power reading results.

The PC 830 receives the information about the power meter 820 from the PLC modem 100S (in this example, the PLC modem 100S2) via the power line 700 and displays the information on a display screen.

Next, functional blocks of the respective units included in the communication system according to the present embodiment will be described.

Figure 3:
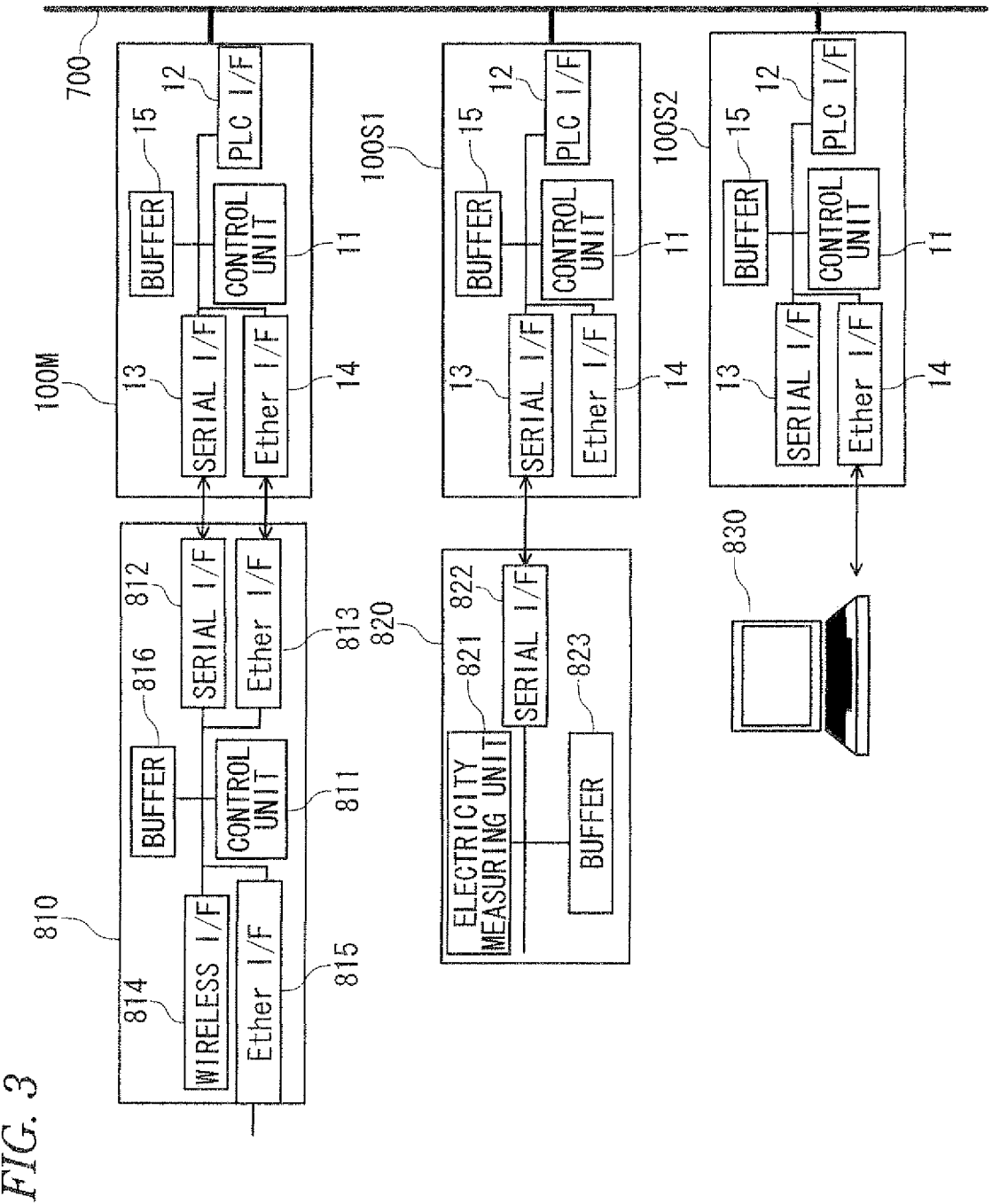
FIG. 3 is a functional block diagram illustrating examples of the respective units included in the communication system according to the embodiment.

FIG. 3 is a functional block diagram illustrating examples of the respective units included in the communication system according to the present embodiment. In this example, the functional blocks of the concentrator 810, the PLC modem 100, and the power meter 820 will be described. Since the functions of the PLC modems 100M and 100S are the same, in this example, the PLC modems will be described as a PLC modem 100.

The concentrator 810 is configured to include a control unit 811, a serial interface (serial I/F) 812, an Ethernet (registered trademark) interface (Ether I/F) 813, a wireless interface (wireless I/F) 814, an Ethernet (registered trademark) interface (Ether I/F) 815, and a buffer 816.

The control unit 811 performs various kinds of control. The serial interface 812 is serially connected to an external device such as the PLC modem 100M via a serial cable. The Ethernet (registered trademark) interface 813 is connected to an external device such as the PLC modem 100M via a LAN cable. The wireless interface 814 is wirelessly connected to an external device such as a server of a power company via a wireless LAN or the like. The Ethernet (registered trademark) interface 815 is connected to an external device such as a server of a power company via a LAN cable. The buffer 816 includes a RAM, a ROM, or the like and stores various types of information. Moreover, the buffer 816 can store first serial communication availability information described later and second serial communication availability information described later.

The PLC modem 100 is configured to include a control unit 11, a PLC interface (PLC I/F) 12, a serial interface (serial I/F) 13, an Ethernet (registered trademark) interface (Ether I/F) 14, and a buffer 15.

The control unit 11 performs various kinds of control, modulation, determination, and the like. The PLC interface 12 is connected to another PLC modem 100 via the power line 700. The serial interface 13 is serially connected to an external device such as the concentrator 810 or the power meter 820 via a serial cable. The Ethernet (registered trademark) interface 14 is connected to an external device such as the concentrator 810 via a LAN cable. The buffer 15 includes a RAM, a ROM, or the like and stores various types of information. Moreover, the buffer 15 can store first serial communication availability information described later and second serial communication availability information described later.

As illustrated in FIG. 1, the main IC 210 functions as the control unit 11. Moreover, the AFE IC 220, the LPF 251, the driver IC 252, the BPF 260, and the coupler 270 function as the PLC interface 12. Further, the serial interface 104, the serial driver 290, and the DART 214 function as the serial interface 13. Further, the modular jack 103 and the Ethernet (registered trademark) PITY IC 230 function as the Ethernet (registered trademark) interface 14. Further, the ROM/RAM 240 functions as the buffer 15.

In addition, the serial interface 13 has the function of a first communication unit that performs serial data communication with a first communication apparatus such as the concentrator 810. Moreover, the control unit 11 has the function of a modulation unit that modulates serial data into data other than the serial data to generate transmission data and performs the reverse process. Further, the PLC interface 12 has the function of a second communication unit that performs first unicast transmission which involves transmitting the transmission data by designating a second communication apparatus such as the PLC modem 100S1 as a transmission destination and second unicast transmission which involves transmitting the transmission data by designating a third communication apparatus such as the PLC modem 100S2 as a transmission destination.

A PLC frame used in power line communication and an Ethernet frame used in Ethernet (registered trademark) communication have an area for designating identification information (Destination ID) of a transmission destination.

The power meter 820 is configured to include an electricity measuring unit 821, a serial interface (serial I/F) 822, and a buffer 823.

The electricity measuring unit 821 measures the amount of electricity consumed by measurement target electrical device such as a household electrical appliance (not illustrated) and generates power data including the measurement results. The serial interface 822 is serially connected to an external device such as the PLC modem 100 via a serial cable. The buffer 823 includes a RAM, a ROM, or the like and stores information such as power data.

Next, data communication between serially connected communication devices will be described.

The serial interface 812 of the concentrator 810, the serial interface 13 of the PLC modem 100, and the serial interface 822 of the power meter 820 include physical or functional configurations for transmitting various types of data such as TXD (Transmit Data), RXD (Receive Data), RTS (Request To Send), and CTS (Clear To Send). "TXD" indicates transmission data. "RXD" indicates received data. "RTS" indicates transmission request data. "CTS" indicates data (hereinafter also referred to as transmission availability state notification data) that performs notification of a transmission availability state.

In the concentrator 810 and the power meter 820, the serial interfaces 812 and 822 each include a physical signal line and a physical pin connected to the signal line, and the respective items of data are transmitted via the respective signal lines. Moreover, in the PLC modem 100, the serial interface 13 includes a physical signal line for transmitting the respective items of data "TXD" and "RXD" and a physical pin connected to the signal line and includes a functional signal line for transmitting the respective items of data "RTS" and "CTS."

Figure 4A:
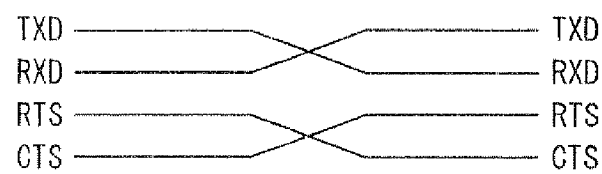
FIG. 4A is a diagram illustrating an example of wiring of serial connection according to an embodiment.

FIG. 4A is a diagram illustrating an example of wiring of serial connection. In the example illustrated in FIG. 4A, "TXD" and "RXD" are connected between multiple communication apparatuses, and "RTS" and "CTS" are connected between multiple communication apparatuses. In this case, "TXD" and "RXD" and "RTS" and "CTS" are cross-connected. In this way, transmission data on one side becomes received data on the other side, and transmission request data on one side becomes transmission availability state notification data on the other side.

Figure 4B:
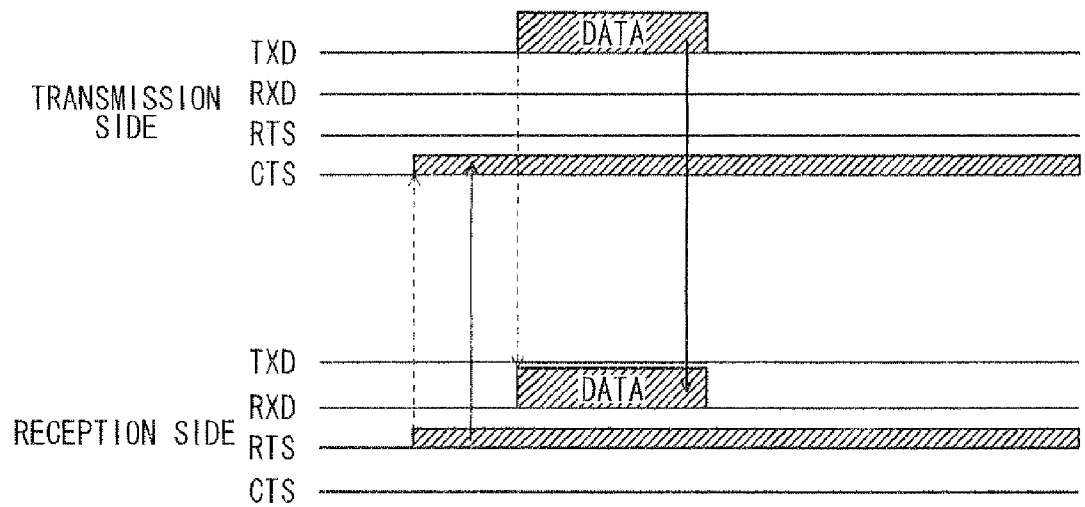
FIG. 4B is a time chart illustrating an example of serial communication between serially connected communication devices according to the embodiment.

FIG. 4B is a time chart illustrating an example of serial communication between serially connected communication devices. In this example, serial communication between the transmission-side PLC modem 100S and the reception-side power meter 820 serially connected to the PLC modem 100S will be described.

As illustrated in FIG. 4B, in the power meter 820, "RTS" is continuously in the High state as long as the PLC modem 100S is serially connected to the serial interface 822. That is, the power meter 820 continuously transmits transmission request data in a state where the PLC modem 100S is serially connected to the power meter 820.

On the other hand, in the PLC modem 100S, "CTS" is continuously in the High state as long as the power meter 820 is serially connected to the serial interface 13. That is, the PLC modem 100S continuously receives the transmission request that is continuously transmitted from the power meter 820. In this way, it can be understood that the power meter 820 is in the transmission available state.

The PLC modem 100S sets "TXD" to the High state in a period when the power meter 820 is in the transmission available state. That is, the PLC modem 100S transmits transmission data to the power meter 820. In the power meter 820, "RXD" is in the High state as long as the transmission data is transmitted from the PLC modem 100S. That is, the power meter 820 receives the transmission data from the PLC modem 100S as received data.

Next, a process in which the PLC modem 100M determines whether the PLC modem 100S and the power meter 820 can perform serial communication will be described.

The PLC modem 100M causes the control unit 11 to determine whether at least one of the PLC modem 100S and the power meter 820 can perform serial communication. The availability of the serial communication is determined based on the serial communication availability information. The serial communication availability information includes first serial communication availability information that indicates whether the PLC modem 100S can perform serial communication and second serial communication availability information that indicates whether the power meter 820 can perform serial communication.

FIG. 5 illustrates an example of a notification sequence of the serial communication availability information when the PLC modem 100S is registered in the PLC modem 100M.

The PLC modem 100S stores first serial communication availability information that indicates the availability of serial communication by the PLC modem 100S in the buffer 15 of the own device. The availability of the serial communication by the PLC modem 100S is determined, for example, based on setting information that permits or inhibits serial communication.

The PLC modem 100S that wants to be registered in the PLC modem 100M acquires the stored first serial communication availability information by referring to the buffer 15 (step S101).

Subsequently, the PLC modem 100M and the PLC modem 100S perform a predetermined authentication process in order to register the information about the PLC modem 100S to the PLC modem 100M. In the authentication process, the PLC modem 100S transmits authentication request data to the PLC modem 100M and transmits the acquired first serial communication availability information (step S102). The first serial communication availability information is stored in a payload of a PLC frame used in the authentication request data.

In the authentication process, when permitting the registration of the PLC modem 100S, the PLC modem 100M registers the state (serial communication available state or serial communication unavailable state) of the PLC modem 100S in the buffer 15 based on the first serial communication availability information (step S103). When the first serial communication availability information of the PLC modem 100S is registered in the PLC modem 100M, the PLC modem 100M transmits authentication completion notification data for notifying completion of the authentication process to the PLC modem 100S (step S104).

According to the notification of the serial communication availability information illustrated in FIG. 5, the PLC modem 100S stores the first serial communication availability information that indicates the availability of the serial communication by the own device and notifies the first serial communication availability information to the PLC modem 100M during registration, whereby the PLC modem 100M can determine whether the PLC modem 100S can perform serial communication. In this way, it is possible to suppress unnecessary information request data from being transmitted to the PLC modem 100S in which serial communication is not available and to efficiently use a network resource.

FIG. 6 illustrates an example of a notification sequence of serial communication availability information using "RTS" and "CTS." The process of FIG. 6 is performed periodically.

First, the power meter 820 transmits "RTS", that is transmission request data, to the PLC modem 100S connected to the power meter 820 (step S201). Subsequently, the PLC modem 100S checks "CTS", that is transmission availability state notification data (step S202). When "CTS" is in the High state, it means that the power meter 820 is in the transmission available state. When "CTS" is in the Low state, it means that the power meter 820 is in the transmission unavailable state.

Subsequently, the PLC modem 100S transmits second serial communication availability information that indicates the availability of the serial communication by the power meter 820 to the PLC modem 100M based on "CTS" checking results (step S203). The second serial communication availability information is stored in a payload of a PLC frame used in the transmission. Upon receiving the second serial communication availability information from the PLC modem 100S, the PLC modem 100M registers the state (transmission available state or transmission unavailable state) of the power meter 820 in the buffer 15 based on the second serial communication availability information (step S204).

According to the notification of the serial communication availability information illustrated, in FIG. 6, the PLC modem 100S detects the state of the power meter 820 by checking "CTS" or the like and notifies the second serial communication availability information that indicates the availability of the serial communication by the power meter 820 to the PLC modem 100M, whereby the PLC modem 100M can determine whether the power meter 820 can perform serial communication. In this way, it is possible to suppress unnecessary information request data from being transmitted to the PLC modem 100S that is serially connected to the power meter 820 in which serial communication is not available and to efficiently use a network resource. Further, by performing the process of FIG. 6 periodically, it is possible to determine the availability of the serial communication taking the latest state of the power meter 820 into consideration.

The availability of the serial communication may be determined by a combination of the process of FIG. 5 and the process of FIG. 6.

Next, details of the communication in the communication system according to the present embodiment will be described by way of first to sixth communication examples below.

(First Communication Example)

Figure 7:
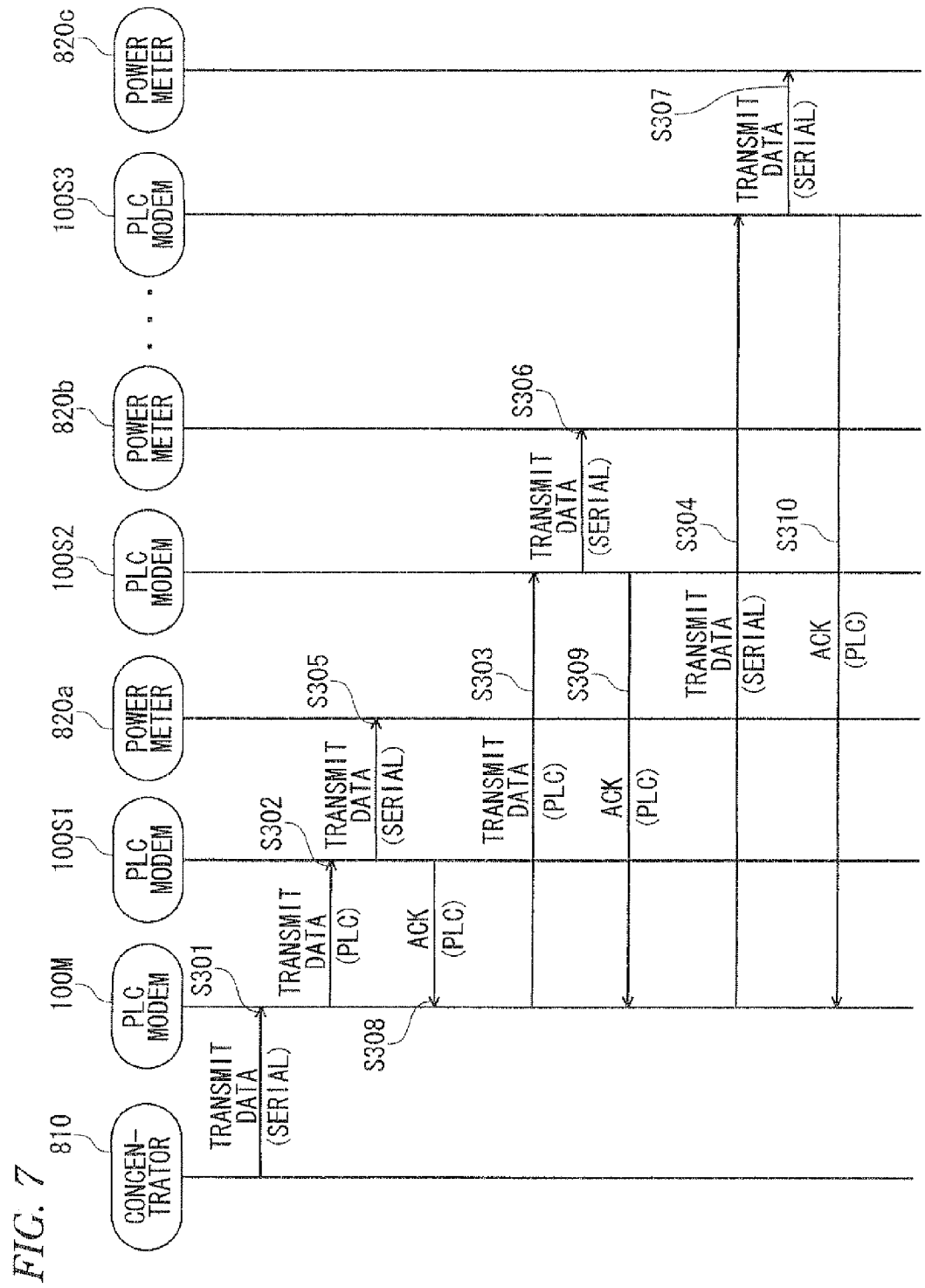
FIG. 7 is a sequence diagram illustrating a first communication example of the communication system according to the embodiment.

FIG. 7 is a sequence diagram illustrating a first communication example of the communication system according to the present embodiment. In the example illustrated in FIG. 7, it is assumed that the concentrator 810 transmits predetermined data to all power meters 820. The predetermined data is data for requesting the information about the power meter 820, for example.

First, the concentrator 810 transmits predetermined data to the PLC modem 100M according to serial communication (step S301). Moreover, the PLC modem 100M receives the predetermined data from the concentrator 810.

When broadcast is set as a transmission destination of the predetermined data, or when no particular transmission destination is set, the PLC modem 100M broadcasts the predetermined data to the respective PLC modems 1005 via the power line 700. That is, the PLC modem 100M transmits the predetermined data to the respective PLC modems 1008 (in this example, PLC modems 10081 to 10083) via the power line 700 (steps S302 to S304). In this case, the PLC modem 100M modulates the predetermined data received as serial data into PLC data and transmits the predetermined data as the PLC data. Moreover, the PLC modem 100S receives the predetermined data from the PLC modem 100M.

In the present embodiment, broadcast transmission includes unicast transmission which involves transmitting data to all PLC modems 100S registered in the PLC modem 100M with a predetermined time shift rather than simultaneously. For example, broadcast transmission according to the present embodiment includes transmitting predetermined data by designating the PLC modem 100S1 as a transmission destination and transmitting the predetermined data by designating the PLC modem 100S2 as a transmission destination. When data is transmitted with a time shift, since a time shift occurs in the timings at which "ACK" is received as a response, it is possible to reliably receive "ACK", and the reliability is improved.

Subsequently, the respective PLC modems 100S transmit predetermined data to the respective power meters 820 (in this example, power meters 820a to 820c) according to serial communication (steps S305 to S307). In this case, the PLC modem 1008 modulates the predetermined data received as the PLC data into serial data and transmits the predetermined data as the serial data.

Subsequently, after the predetermined data is transmitted to the respective power meters 820, the respective PLC modems 100S transmit "ACK" to the PLC modem 100M (step S308 to S310). This "ACK" includes at least one of the first serial communication availability information and the second serial communication availability information. Upon receiving "ACK", the PLC modem 100M determines whether transmission of the predetermined data has been successful based on the serial communication availability information included in "ACK."

Although not illustrated in FIG. 7, when a response to the predetermined data from the PLC modem 100S is required, the power meter 820 transmits response data to the concentrator 810 via the PLC modem 100S and the PLC modem 100M. Power data is an example of the response data.

Moreover, it may be configured so that, after transmitting the predetermined data by designating the PLC modem 100S1 as the transmission destination, the PLC modem 100M transmits the predetermined data by designating the PLC modem 100S2 as the transmission destination. Further, it may be configured so that, after receiving "ACK" from the PLC modem 100S1 in relation to the transmission to the PLC modem 100S1, the PLC modem 100M transmits the predetermined data to the PLC modem 100S2. In this way, it is possible to cause the reception timing of "ACK" to occur at a different time and to perform communication reliably.

According to the communication illustrated in FIG. 7, the PLC modem 100M can transmit the serial data transmitted from the concentrator 810, which is one kind of serial communication device, to a plurality of PLC modems 100S. Thus, since the serial data from the concentrator 810 is finally transmitted to the power meter 820 via the PLC modem 100M and the PLC modem 100S as serial data, the concentrator 810 can transmit predetermined data to a plurality of transmission destinations without a particular need to recognize whether the transmission path on the route therebetween is a serial path or not.

In the description of the following communication examples, since the modulation performed as necessary is the same as the modulation according to the first communication example, description thereof will not be provided.

(Second Communication Example)

Figure 8:
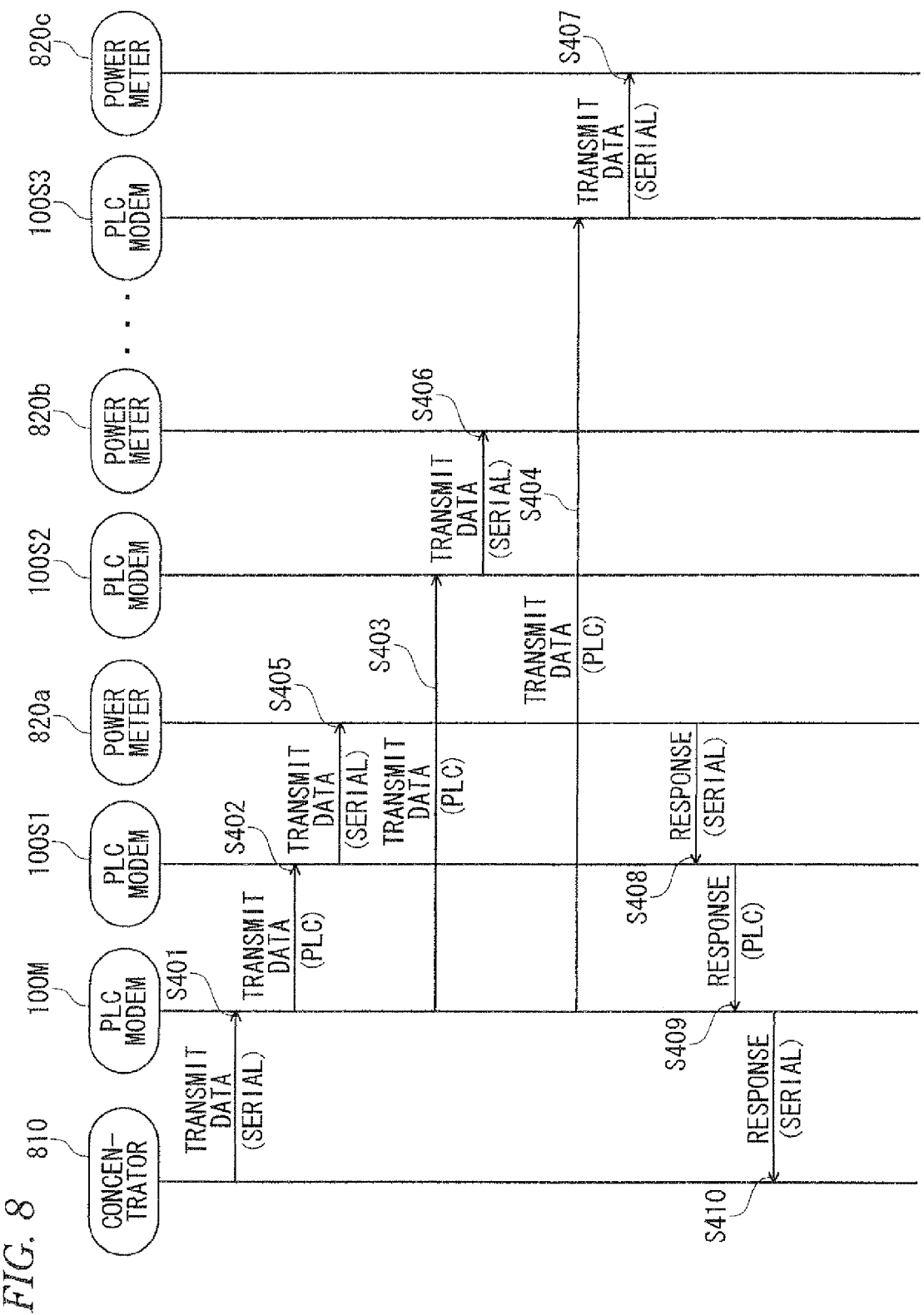
FIG. 8 is a sequence diagram illustrating a second communication example of the communication system according to the embodiment.

FIG. 8 is a sequence diagram illustrating a second communication example of the communication system according to the present embodiment. In the example illustrated in FIG. 8, it is assumed that the concentrator 810 requests the information about a specific power meter 820a, and the specific power meter 820a transmits power data to the concentrator 810. Moreover, "ACK" transmitted from the PLC modem 100S to the PLC modem 100M is omitted to be illustrated.

First, the concentrator 810 transmits information request data to the PLC modem 100M according to serial communication (step S401). The information request data is data for requesting power data, for example. The information request data includes information (an identification ID or the like) that indicates that the information request data is to be transmitted to the power meter 820a.

Upon receiving the information request data from the concentrator 810, the PLC modem 100M broadcasts the information request data to the registered PLC modems 100S (in this example, the PLC modems 100S1 to 100S3) (steps S402 to S404).

Upon receiving the information request data from the PLC modem 100M, the respective PLC modems 100S transmit the information request data to the respective serially connected power meters 820 (in this example, the power meters 820a to 820c) (steps S405 to S407).

Upon receiving the information request data from the respective PLC modems 100S, the respective power meters 820 analyze the respective items of information request data. Since the respective items of information request data include information that indicates that the data is to be transmitted to the power meter 820a, the power meter 820a determines that the information request data is to be transmitted to the own device. Moreover, the power meter 820a sends response data back to the information request data to the concentrator 810 via the PLC modem 100S1 and the PLC modem 100M (steps S208 to S210). The response data is power data, for example.

On the other hand, the respective power meters 820 (in this example, the power meters 820b and 820c) other than the power meter 820a determine that the information request data is not to be transmitted to the own devices and do not send back response data.

According to the communication illustrated in FIG. 8, the PLC modem 100M transmits the serial data transmitted from the concentrator 810, which is one kind of serial communication device, to a plurality of PLC modems 100S and obtain necessary information such as power data from the plurality of PLC modems 100S. Thus, since the serial data from the concentrator 810 is finally transmitted to the power meter 820 via the PLC modem 100M and the PLC modem 100S as serial data, the concentrator 810 can transmit predetermined data to a specific transmission destination among a plurality of devices without a particular need to recognize whether the transmission path on the route therebetween is a serial path or not.

(Third Communication Example)

Figure 9:
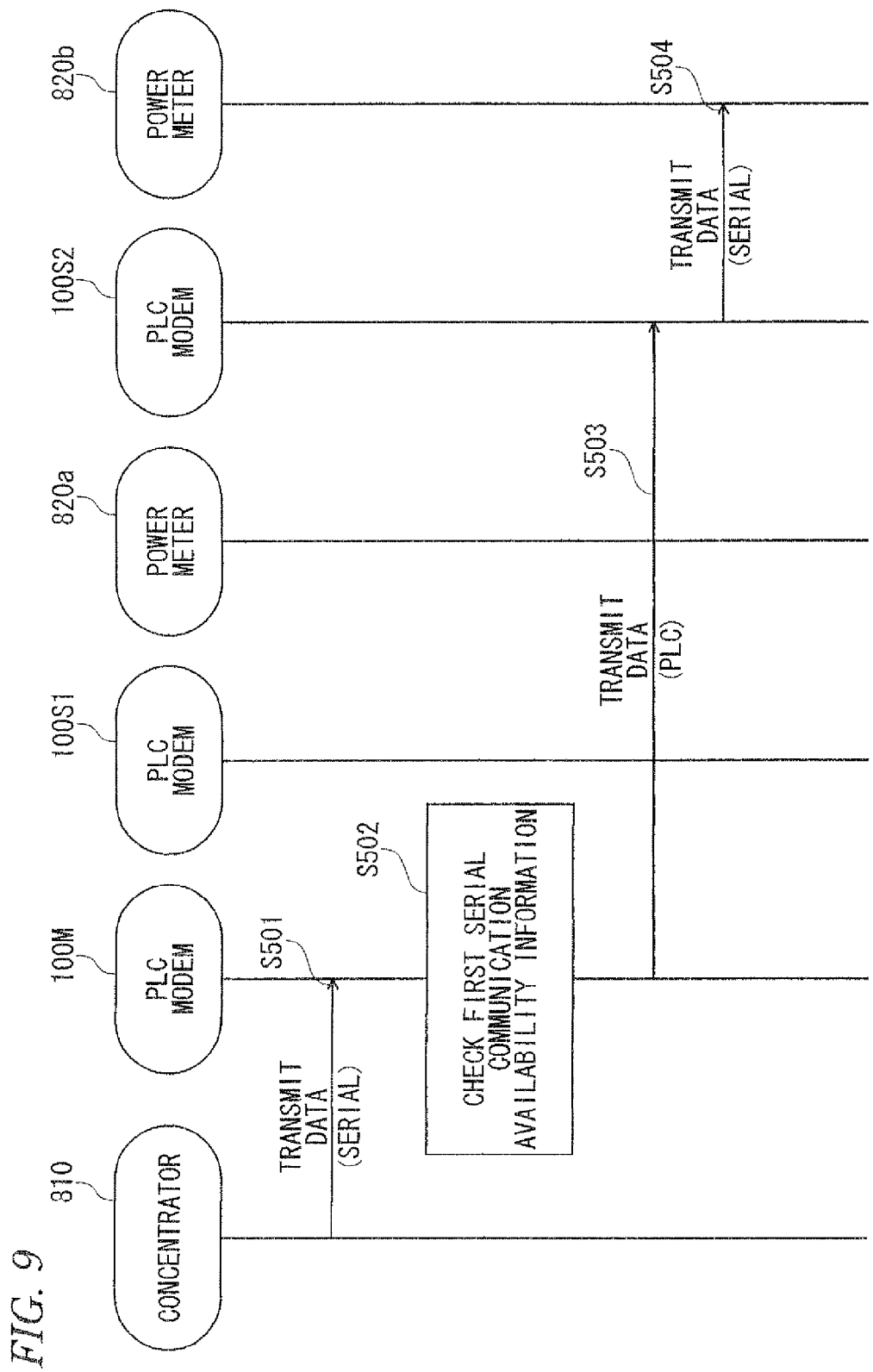
FIG. 9 is a sequence diagram illustrating a third communication example of the communication system according to the embodiment.

Next, FIG. 9 is a sequence diagram illustrating a third communication example of the communication system according to the present embodiment. In the example illustrated in FIG. 9, it is assumed that the concentrator 810 transmits predetermined data to the power meter 820. The predetermined data is data for requesting the information about the power meter 820, for example.

First, the concentrator 810 transmits predetermined data to the PLC modem 100M according to serial communication (step S501).

Subsequently, upon receiving the predetermined data from the concentrator 810, the PLC modem 100M checks serial communication availability information by referring to the buffer 15 (step S502). The serial communication availability information herein is at least one of the first serial communication availability information and the second serial communication availability information. In this example, it is assumed that the first serial communication availability information indicates that the PLC modem 100S1 cannot perform serial communication, and the other PLC modem 100S (in this example, the PLC modem 100S2) can perform serial communication. Alternatively, it is assumed that the second serial communication availability information indicates that the power meter 820a is in the transmission unavailable state, and the other power meter 820 (in this example, the power meter 820b) is in the transmission available state.

The PLC modem 100M designates the PLC modem 100S (in this example, the PLC modem 100S2) which is not in the serial communication unavailable state or the PLC modem 100S (in this example, the PLC modem 100S2) which is not serially connected to the power meter 820 that is in the transmission unavailable state, among the registered PLC modems 100S as a transmission destination based on the result of the checking of the serial communication availability information. Moreover, the PLC modem 100M transmits the predetermined data to the PLC modem 100S2 (step S503).

Upon receiving the predetermined data from the PLC modem 100M, the PLC modem 100S2 performs necessary modulation and transmits the predetermined data to the serially connected power meter 820b (step S504).

On the other hand, the PLC modem 100M stops transmission (unicast transmission) without transmitting the predetermined data from the concentrator 810 to the PLC modem 100S1 which is in the serial communication unavailable state or the PLC modem 100S1 which is serially connected to the power meter 820 that is in the transmission unavailable state.

According to the communication illustrated in FIG. 9, by stopping transmission of the predetermined data to the PLC modem 100S which is in the serial communication unavailable state or the PLC modem 100S which is serially connected to the power meter 820 that is in the transmission unavailable state based the serial communication availability information registered in the process of FIGS. 5 and 6, it is possible to suppress unnecessary data from being transmitted on a network.

(Fourth Communication Example)

Figure 10:
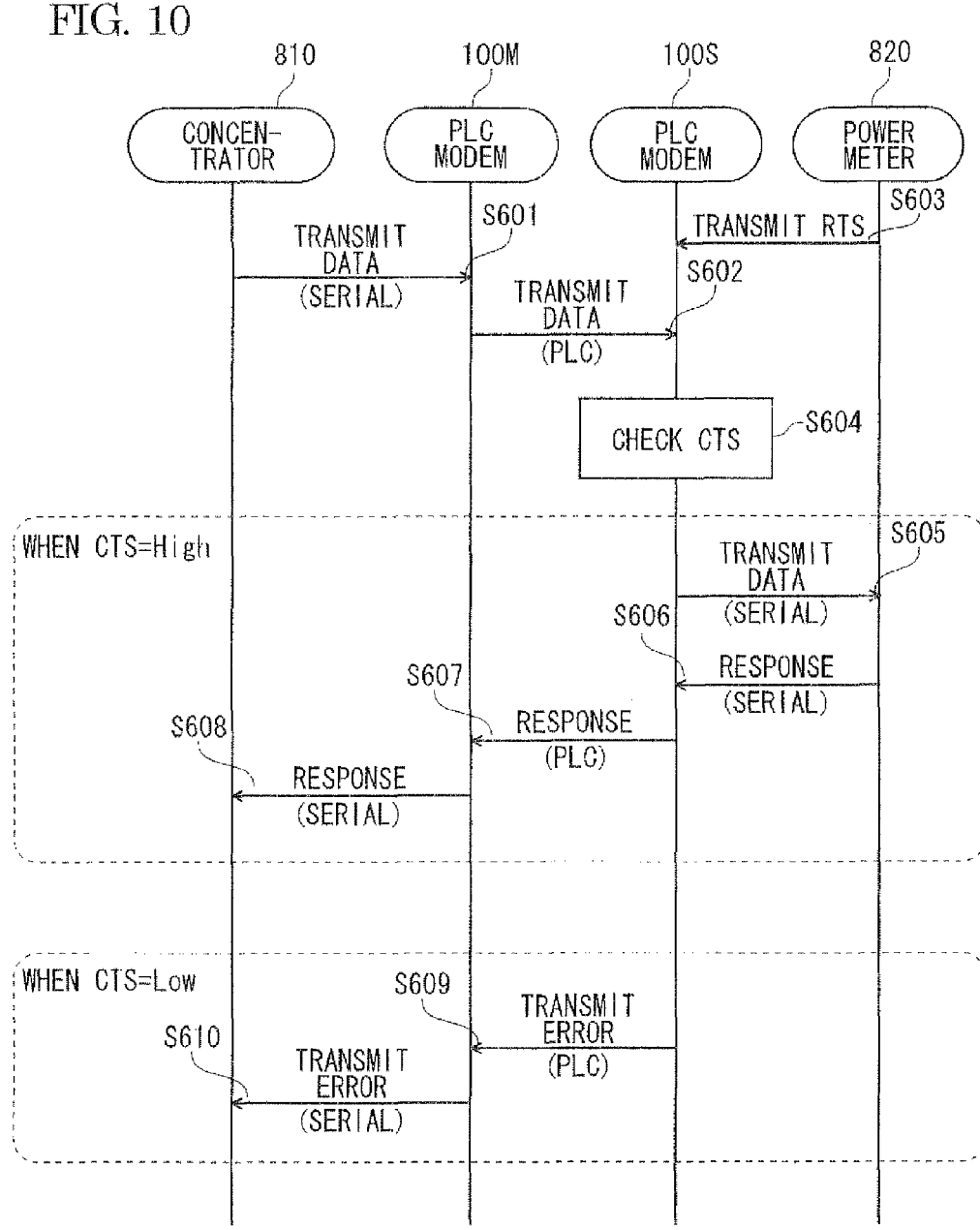
FIG. 10 is a sequence diagram illustrating a fourth communication example of the communication system according to the embodiment.

FIG. 10 is a sequence diagram illustrating a fourth communication example of the communication system according to the present embodiment. In the example illustrated in FIG. 10, it is assumed that the concentrator 810 requests the information about the power meter 820, and the power meter 820 transmits power data to the concentrator 810, or the PLC modem 100S transmits error response data. The process of FIG. 10 is executed when monitoring of a power meter is performed using "RTS" and "CTS."

First, the concentrator 810 transmits information request data to the PLC modem 100M according to serial communication (step S601). The information request data is data for requesting power data, for example. Upon receiving the information request data from the concentrator 810, the PLC modem 100M broadcasts the information request data to the registered PLC modem 100S (step S602).

On the other hand, the power meter 820 that is serially connected to the PLC modem 100S transmits "RTS", that is transmission request data (step S603). Upon receiving the information request data from the PLC modem 100M, the PLC modem 100S checks "CTS", that is transmission availability state notification data (step S604).

When "CTS" is in the High state, that is the power meter 820 is in the transmission available state, the processes of steps S605 to S608 are performed. On the other hand, when "CTS" is in the Low state, that is the power meter 820 is in the transmission unavailable state, the processes of steps S609 to S610 are performed.

When "CTS" is in the High state, upon receiving the information request data from the PLC modem 100M, the PLC modem 100S transmits the information request data to the serially connected power meter 820 according to serial communication (step S605).

Upon receiving the information request data from the PLC modem 100S, the power meter 820 analyzes the information request data. Moreover, the power meter 820 sends response data back to the information request data to the concentrator 810 via the PLC modem 100S and the PLC modem 100M (steps S606 to S608). The response data is power data, for example.

On the other hand, when "CTS" is in the Low state, the PLC modem 100S transmits error response data that indicates the power meter 820 is in the transmission unavailable state to the concentrator 810 via the PLC modem 100M (steps S809 to S610). In this case, the information request data is not transmitted to the power meter 820.

According to the process of FIG. 10, the PLC modem 100S can determine the transmission availability of the power meter in realtime. Thus, it is possible to monitor the power meter depending on the present state of the power meter. Moreover, since the transmission of the information request data is performed or stopped depending on the state of the PLC modem 100S and the power meter, it is possible to efficiently use a network resource.

(Fifth Communication Example)

Figure 11:
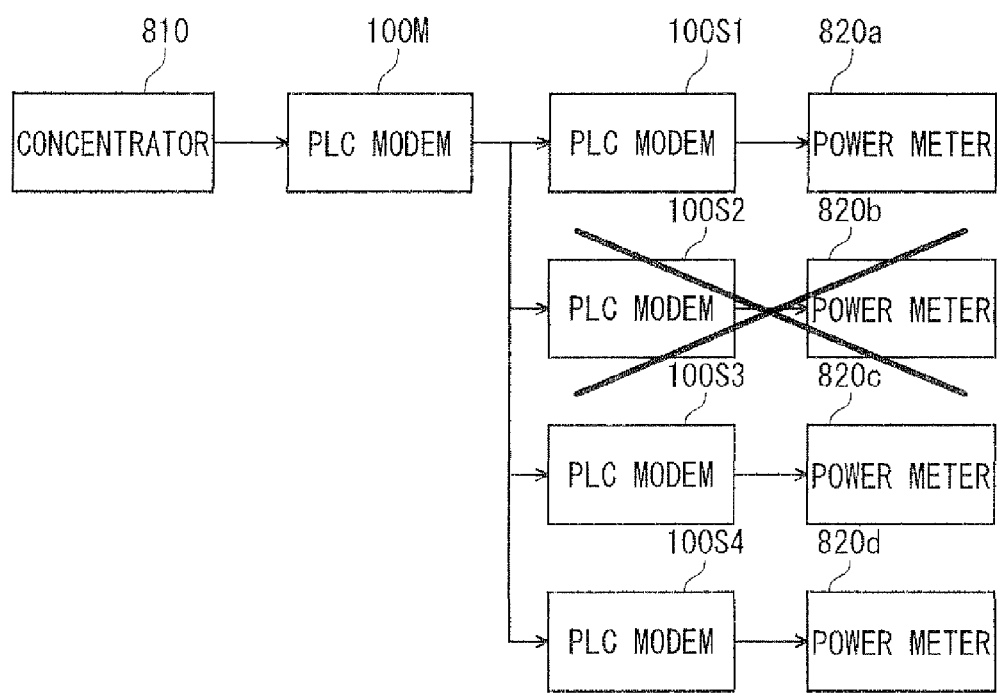
FIG. 11 is a sequence diagram illustrating a fifth communication example of the communication system according to the embodiment.

FIG. 11 is a conceptual diagram illustrating a fifth communication example of the communication system according to the present embodiment. In this example, it is assumed that in the communication system according to the present embodiment, at least one of the PLC modems 100S or power meters 820 registered in the PLC modem 100M is absent. In the example illustrated in FIG. 11, at least one of the PLC modem 100S2 and the power meter 820b that is to be serially connected to the PLC modem 100S2 is absent.

This communication example will be generally described. After receiving the information request data from the concentrator 810, the PLC modem 100M broadcasts the information request data to the PLC modems 100S1 to 100S4 (in this example, unicast transmission is performed sequentially to the PLC modems 100S1 to 100S4). In response to the information request data, although response data is sent back from the PLC modem 100S1, response data is not sent back from the PLC modem 100S2. That is, in the communication with the PLC modem 100S2, response data is not sent back within a predetermined period, but timeout occurs.

In this communication example, even when timeout occurs, retransmission control of the PLC modem 100S2 is not performed immediately after the timeout, but information request data is unicast to the PLC modems 100S3 and 100S4 which are the subsequent destinations. The PLC modems 100S3 and 100S4 send back response data to the information request data.

As described above, after completing the transmission of the information request data to PLC modems other than the absent PLC modem 100S2 among the PLC modems 100S registered in the PLC modem 100M, the information request data is retransmitted to the absent PLC modem 100S2. That is, after the information request data is transmitted to all PLC modems 100S registered in the PLC modem 100M, the information request data is retransmitted to only the PLC modem 100S in which retransmission control is required. In this way, it is possible to shorten the time required for the PLC modem 100M to transmit the information request data to the respective PLC modems 100S.

Figure 12:
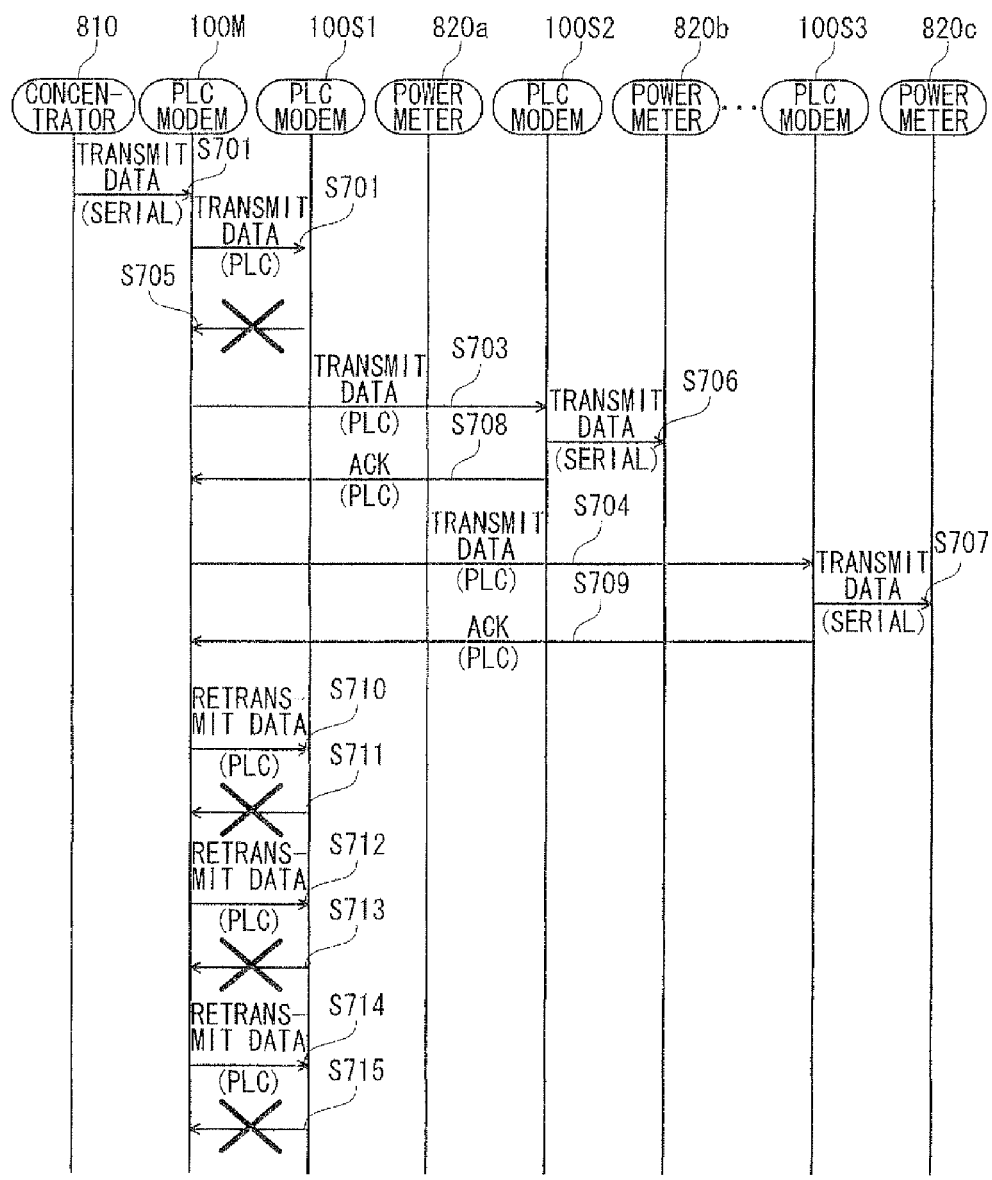
FIG. 12 is a sequence diagram illustrating the fifth communication example of the communication system according to the embodiment.

FIG. 12 is a sequence diagram illustrating the fifth communication example of the communication system according to the present embodiment. In the example illustrated in FIG. 12, it is assumed that the concentrator 810 transmits predetermined data to all power meters 820. The predetermined data is data for requesting the information about the power meter 820, for example. Moreover, it is assumed that the PLC modem 100S1 is absent, and the other PLC modems 100S and the power meters 820 are normally present.

First, the concentrator 810 transmits the predetermined data to the PLC modem 100 according to serial communication (step S701). Moreover, the PLC modem 100M receives the predetermined data from the concentrator 810.

When broadcast is set as a transmission destination of the predetermined data, or when no particular transmission destination is set, the PLC modem 100M broadcasts the predetermined data to the respective PLC modems 100S via the power line 700. That is, the PLC modem 100M transmits the predetermined data to the respective PLC modems 100S (in this example, PLC modems 100S1 to 100S3) via the power line 700 (steps S702 to S704).

In this example, since the PLC modem 100S1 is absent, the PLC modem 100S1 may not transmit "ACK" with respect to the predetermined data from the PLC modem 100M. Thus, the PLC modem 100M will not receive "ACK" from the PLC modem 100S1, and timeout occurs after the elapse of a predetermined period (step S705). When timeout occurs in this manner, the PLC modem 100M transmits the predetermined data to the subsequent PLC modems 100S2 to 100S3 without immediately retransmitting the predetermined data to the PLC modem 100S1 (steps S703 to S704).

Upon receiving the predetermined data from the PLC modem 100M, the PLC modems 100S2 to 100S3 transmit the predetermined data to the respective serially connected power meters 820b to 820c according to serial communication (steps S706 to S707).

Subsequently, when the predetermined data is transmitted to the power meter 820, the PLC modems 100S2 to 100S3 transmit "ACK" to the PLC modem 100M (steps S708 to S709). This "ACK" includes at least one of the first serial communication availability information and the second serial communication availability information.

As described above, the PLC modem 100M completes the transmission to the other PLC modems 100S registered in the PLC modem 100M before performing retransmission control of the timed-out PLC modem 100S1. After completing the transmission to the other PLC modems 100S, the PLC modem 100M retransmits the predetermined data to the PLC modem 100S (step S710). When it is not possible to receive "ACK" in the retransmission (step S711), the predetermined data is retransmitted a predetermined number of times (steps S712 and S714), and "ACK" from the PLC modem 100S1 with respect to the retransmission is waited for (steps S713 and S715).

The PLC modem 100M may determine that the PLC modem 100S is absent and cannot perform serial communication at the respective timeout timings in steps S705, S711, S713, and S715. Moreover, the PLC modem 100M may determine that the PLC modem 100S is absent and cannot perform serial communication when the number of times of retransmission of the information request data exceeds a predetermined number.

According to the process of FIG. 12, even when communication with a specific PLC modem 100S times out, the information request data is transmitted to all PLC modems 100S registered in the PLC modem 100M, and then, the information request data is retransmitted to only the PLC modem 100S in which retransmission control is required. In this way, it is possible to shorten the time required for the PLC modem 100M to transmit the information request data to the respective PLC modems 100S.

(Sixth Communication Example)

FIG. 13 is a sequence diagram illustrating a sixth communication example of the communication system according to the present embodiment. In the example illustrated in FIG. 13, it is assumed that the concentrator 810 transmits information request data to the power meter 820. The information request data is data for requesting the information about the power meter 820, for example. Moreover, it is assumed that the PLC modem 100S or the power meter 820 that is to be serially connected to the PLC modem 100S is absent.

First, the concentrator 810 transmits predetermined data to the PLC modem 100 according to serial communication (step S801). Upon receiving the information request data from the concentrator 810, the PLC modem 100M transmits the information request data to the registered PLC modem 100S (step S802).

Subsequently, the processes of steps S803 to S804 are executed when the PLC modem 100S functioning as slave device is absent, and the processes of steps S805 to S807 are executed when the power meter 820 is absent.

When the PLC modem 100S is absent, the PLC modem 100S will not transmit "ACK" with respect to the information request data from the PLC modem 100M. Thus, the PLC modem 100M may not receive "ACK" from the PLC modem 100S, and timeout occurs after the elapse of a predetermined period (step S803). When timeout occurs in this manner, the PLC modem 100M determines that the PLC modem 100S is absent. Moreover, the PLC modem 100M registers information that indicates that the PLC modem 100S is "absent" in the buffer 15 as first serial communication availability information (step S804).

On the other hand, when the power meter 820 is absent, the PLC modem 100S checks "CTS" (step S805), and the "CTS" is in the Low state. In this case, the PLC modem 100S recognizes that the power meter 820 is in the transmission unavailable state. Moreover, the PLC modem 100S transmits information that indicates that the power meter 820 is in the transmission unavailable state to the PLC modem 100M as second serial communication availability information (step S806). Upon receiving this information, the PLC modem 100S registers information that indicates that the power meter 820 is in the "transmission unavailable state" in the buffer 15 as the second serial communication availability information (step S807).

When a response to the information request data is not received from the PLC modem 100M before the elapse of a predetermined period after the information request data is transmitted to the PLC modem 100 in step S810, the concentrator 810 transmits a log acquisition request to the PLC modem 100M according to Ethernet (registered trademark) communication (step S808). Upon receiving the log acquisition request from the concentrator 810, the PLC modem 100M transmits a log acquisition response to the log acquisition request to the concentrator 810 according to Ethernet (registered trademark) communication (step S809). Here, the PLC modem 100M includes serial communication availability information (at least one of the first serial communication availability information and the second serial communication availability information) in the log acquisition response.

Upon receiving the log acquisition response from the PLC modem 100M, the concentrator 810 can recognize whether the response to the information request data not being sent back is due to a problem of the PLC modem 100S or the power meter 820 by referring to the serial communication availability information. Further, the concentrator 810 may notify the serial communication availability information to a server of a power company, which is high-level equipment.

According to the communication illustrated in FIG. 13, when desired data is not obtained with respect to the information request data, the concentrator 810 can recognize the cause thereof.

Further, the log acquisition request transmitted from the concentrator 810 to the PLC modem 100M and the log acquisition response transmitted from the PLC modem 100M to the concentrator 810 are transmitted according to Ethernet (registered trademark) communication. In this manner, a communication interface may be switched according to the purpose in such a way that data such as power data that is actually communicated is transmitted according to serial communication, and communication analysis data such as log data is transmitted according to Ethernet (registered trademark) communication.

Moreover, the log acquisition request and the log acquisition response may be transmitted according to serial communication. The communication analysis data may be transmitted according to serial communication. In this way, it is possible to eliminate configurations for realizing an Ethernet (registered trademark) communication function in the PLC modem 100 and to simplify the device.

Similarly, the error response data in steps S609 to S610 (see FIG. 10) in the fourth communication example may be transmitted according to Ethernet (registered trademark) communication or serial communication as an example of communication analysis data.

A communication apparatus according to the above embodiment is a communication apparatus that communicates with another communication apparatus, including: a first communication unit configured to receive serial data from a first communication apparatus that is serially connected to the communication apparatus; a modulation unit configured to modulate the serial data received by the first communication unit into data other than the serial data to generate transmission data; and a second communication unit configured to perform first unicast transmission which involves transmitting the transmission data by designating a second communication apparatus as a transmission destination and second unicast transmission which involves transmitting the transmission data by designating a third communication apparatus as a transmission destination.

According to the communication apparatus, it is possible to transfer serial data transmitted from a serial communication device to a plurality of communication apparatuses.

The communication apparatus according to the above embodiment is also configured so that the second communication unit performs the second unicast transmission after the first unicast transmission.

According to the communication apparatus, since responses with respect to the first unicast transmission are sequentially received, it is possible to reduce the possibility of failure in recognition of the responses by concurrently reception, and perform assured communication.

The communication apparatus according to the above embodiment is also configured so that the second communication unit performs the second unicast transmission after received a response to the first unicast transmission.

According to the communication apparatus, since responses with respect to the first unicast transmission are not received concurrently and there is no failure in recognition of the responses by concurrently reception, it is possible to perform assured communication.

The communication apparatus according to the above embodiment further includes: a determination unit configured to determine at least one of availability of serial communication by the second communication apparatus and availability of serial communication by electrical device that is serially connected to the second communication apparatus.

According to the communication apparatus, it is possible to recognize whether the second communication device and the electrical device that is serially connected to the second communication device can perform serial communication.

The communication apparatus according to the above embodiment is also configured so that the second communication unit receives first serial communication availability information that indicates the availability of the serial communication by the second communication apparatus from the second communication apparatus, and the determination unit determines the availability of the serial communication by the second communication apparatus based on the first serial communication availability information.

According to the communication apparatus, it is possible to recognize whether the second communication apparatus can perform serial communication by receiving from the second communication apparatus the notification of information indicating whether the second communication apparatus can perform the serial communication.

The communication apparatus according to the above embodiment is also configured so that the second communication unit receives second serial communication availability information that indicates availability of the serial communication by the electrical device from the second communication apparatus, and the determination unit determines the availability of the serial communication by the electrical device based on the second serial communication availability information.

According to the communication apparatus, it is possible to recognize whether the electrical device can perform serial communication by receiving from the second communication apparatus the notification of information indicating whether the electrical device can perform the serial communication.

The communication apparatus according to the above embodiment is also configured so that the second communication unit transmits an information request for requesting information concerning the electrical device, and the determination unit determines that the second communication apparatus is absent when the second communication unit fails to receive a response to the information request within a predetermined period.

According to the communication apparatus, since it is determined that the second communication apparatus is absent when the timeout occurs, it is possible to recognize that the second communication apparatus cannot perform serial communication.

The communication apparatus according to the above embodiment is also configured so that the second communication unit transmits an information request for requesting information concerning the electrical device, and then, retransmits the information request when failed to receive a response to the information request, and the determination unit determines that the second communication apparatus is absent when the number of times of retransmission of the information request retransmitted by the second communication unit is a predetermined number or more.

According to the communication apparatus, since it is determined that the second communication apparatus is absent when the number of times of retransmission of the information request is a prescribed number or more, it is possible to recognize that the second communication apparatus cannot perform serial communication.

The communication apparatus according to the above embodiment is also configured so that the second communication unit stops the first unicast transmission when the determination unit determines that the serial communication by at least one of the second communication apparatus and the electrical device is unavailable, or that the second communication apparatus is absent.

According to the communication apparatus, it is possible to reduce the network load by stopping the information request even when a response to the information request cannot be received after the transmission of the information request.

The communication apparatus according to the above embodiment is also configured to that the second communication unit performs communication via a power line.

According to the communication apparatus, it is possible to transfer serial data transmitted from a serial communication device to a plurality of communication apparatuses even in a power line communication apparatus that performs a communication via a power line.

Further, a communication apparatus according to the above embodiment is a communication apparatus that communicates with another communication apparatus, including: a first communication unit configured to receive serial communication availability information that indicates availability of serial communication by an electrical device that is serially connected to the communication apparatus from the electrical device in a format of serial data; a modulation unit configured to modulate the serial communication availability information received by the first communication unit into data other than serial data to generate transmission data; and a second communication unit configured to perform unicast transmission which involves transmitting the transmission data by designating the other communication apparatus as a transmission destination.

According to the communication apparatus, it is possible to notify whether the own apparatus can performs serial communication.

Further, a communication apparatus according to the above embodiment is a communication apparatus that communicates with another communication apparatus, including: a storage unit configured to store serial communication availability information that indicates availability of serial communication by the communication apparatus; a modulation unit configured to modulate the serial communication availability information stored in the storage unit into data other than serial data to generate transmission data; and a communication unit configured to perform unicast transmission which involves transmitting the transmission data by designating the other communication apparatus as a transmission destination.

According to the communication apparatus, it is possible to notify whether the own apparatus can performs serial communication.

Further, a communication apparatus according to the above embodiment is a communication apparatus that communicates with another communication apparatus, including: a first communication unit configured to receive serial communication availability information that indicates availability of serial communication by an electrical device that is serially connected to the communication apparatus from the electrical device in a format of serial data; a modulation unit configured to modulate the serial communication availability information received by the first communication unit into data other than serial data to generate transmission data; and a second communication unit configured to perform unicast transmission which involves transmitting the transmission data by designating the other communication apparatus as a transmission destination.

According to the communication apparatus, it is possible to notify whether the own apparatus can performs serial communication. Moreover, it is possible to transmit serial data transmitted from the electrical device that is serially connected to the communication apparatus to a particular communication apparatus.

The communication apparatus according to the above embodiment is also configured so that the communication unit, or the second communication unit performs communication via a power line.

According to the communication apparatus, it is possible to notify that the own apparatus or the electrical device connected to the own apparatus can perform serial communication even in a power line communication apparatus that performs a communication via a power line.

An integrated circuit according to the above embodiment is an integrated circuit used in a communication apparatus that communicates with another communication apparatus, including: a first communication unit configured to receive serial data from a first communication apparatus that is serially connected to the communication apparatus; a demodulation unit configured to modulate the serial data received by the first communication unit into data other than the serial data to generate transmission data; and a second communication unit configured to perform first unicast transmission which involves transmitting the transmission data by designating a second communication apparatus as a transmission destination and second unicast transmission which involves transmitting the transmission data by designating a third communication apparatus as a transmission destination.

According to the integrated circuit, it is possible to transfer serial data transmitted from a serial communication device to a plurality of communication apparatuses.

A communication method according to the above embodiment is a communication method in a communication apparatus that communicates with another communication apparatus, including: receiving serial data from a first communication apparatus that is serially connected to the communication apparatus; modulating the serial data into data other than the serial data to generate transmission data; performing first unicast transmission which involves transmitting the transmission data by designating a second communication apparatus as a transmission destination; and performing second unicast transmission which involves transmitting the transmission data by designating a third communication apparatus as a transmission destination.

According to the communication method, it is possible to transfer serial data transmitted from a serial communication device to a plurality of communication apparatuses.

The above embodiment is useful in a communication apparatus or the like capable of transmitting serial data transmitted from serial communication device to a plurality of communication apparatuses.

While the present invention has been described with reference to specific embodiments, it is obvious to one skilled in the art that various changes and modifications can be made without departing from the spirit and the scope of the present invention.

The present application is based upon Japanese Patent Application No. 2010-086453, filed on Apr. 2, 2010, the entire contents of which are incorporated herein by reference.

What is claimed is:

1. A communication apparatus that communicates with another communication apparatus, comprising:
    a first communication unit configured to receive serial data from a first communication apparatus that is serially connected to the communication apparatus;
    a first modulation unit configured to modulate the serial data received by the first communication unit into data other than the serial data to generate transmission data;
    a second communication unit configured to perform first unicast transmission which involves transmitting the transmission data by designating a second communication apparatus as a transmission destination and second unicast transmission which involves transmitting the transmission data by designating a third communication apparatus as a transmission destination; and
    a determination unit configured to determine at least one of availability of serial communication by the second communication apparatus and availability of serial communication by electrical device that is serially connected to the second communication apparatus.

2. The communication apparatus according to claim 1, wherein
    the second communication unit performs the second unicast transmission after the first unicast transmission.

3. The communication apparatus according to claim 1, wherein
    the second communication unit performs the second unicast transmission after received a response to the first unicast transmission.

4. The communication apparatus according to claim 1, wherein
    the second communication unit receives first serial communication availability information that indicates the availability of the serial communication by the second communication apparatus from the second communication apparatus, and
    the determination unit determines the availability of the serial communication by the second communication apparatus based on the first serial communication availability information.

5. The communication apparatus according to claim 1, wherein
    the second communication unit receives second serial communication availability information that indicates availability of the serial communication by the electrical device from the second communication apparatus, and
    the determination unit determines the availability of the serial communication by the electrical device based on the second serial communication availability information.

6. The communication apparatus according to claim 1, wherein
    the second communication unit transmits an information request for requesting information concerning the electrical device, and
    the determination unit determines that the second communication apparatus is absent when the second communication unit fails to receive a response to the information request within a predetermined period.

7. The communication apparatus according to claim 1, wherein
    the second communication unit transmits an information request for requesting information concerning the electrical device, and then, retransmits the information request when failed to receive a response to the information request, and
    the determination unit determines that the second communication apparatus is absent when the number of times of retransmission of the information request retransmitted by the second communication unit is a predetermined number or more.

8. The communication apparatus according to claim 1, wherein
    the second communication unit stops the first unicast transmission when the determination unit determines that the serial communication by at least one of the second communication apparatus and the electrical device is unavailable, or that the second communication apparatus is absent.

9. The communication apparatus according to claim 1, wherein
    the second communication unit performs communication via a power line.

10. The communication apparatus according to claim 1, wherein
the second communication unit performs the first unicast transmission when the second communication apparatus receives a transmission request from an electrical device that is connectable to the second communication apparatus.

11. The second communication apparatus according to claim 1, comprising:
a third communication unit configured to receive serial communication availability information that indicates availability of serial communication by the electrical device that is serially connected to the second communication apparatus from the electrical device in a format of serial data;
a third modulation unit configured to modulate the serial communication availability information received by the first communication unit into data other than serial data to generate transmission data; and
a second communication unit configured to perform unicast transmission which involves transmitting the transmission data by designating the communication apparatus as a transmission destination.

12. The communication apparatus according to claim 10, wherein
the second communication unit stops the first unicast transmission when the second communication apparatus does not receive the transmission request from the electrical device.

13. The second communication apparatus according to claim 1, comprising:
a storage unit configured to store serial communication availability information that indicates availability of serial communication by the second communication apparatus;
a second modulation unit configured to modulate the serial communication availability information stored in the storage unit into data other than serial data to generate transmission data; and
a communication unit configured to perform unicast transmission which involves transmitting the transmission data by designating the communication apparatus as a transmission destination.

14. The communication apparatus according to claim 13, wherein
the communication unit or the second communication unit performs communication via a power line.

15. An integrated circuit used in a communication apparatus that communicates with another communication apparatus, comprising:
a first communication unit configured to receive serial data from a first communication apparatus that is serially connected to the communication apparatus;
a modulation unit configured to modulate the serial data received by the first communication unit into data other than the serial data to generate transmission data;
a second communication unit configured to perform first unicast transmission which involves transmitting the transmission data by designating a second communication apparatus as a transmission destination and second unicast transmission which involves transmitting the transmission data by designating a third communication apparatus as a transmission destination; and
a determination unit configured to determine at least one of availability of serial communication by the second communication apparatus and availability of serial communication by electrical device that is serially connected to the second communication apparatus.

16. A communication method in a communication apparatus that communicates with another communication apparatus, comprising:
receiving serial data from a first communication apparatus that is serially connected to the communication apparatus;
modulating the serial data into data other than the serial data to generate transmission data;
performing first unicast transmission which involves transmitting the transmission data by designating a second communication apparatus as a transmission destination;
performing second unicast transmission which involves transmitting the transmission data by designating a third communication apparatus as a transmission destination; and
determining at least one of availability of serial communication by the second communication apparatus and availability of serial communication by electrical device that is serially connected to the second communication apparatus.

* * * * *